United States Patent [19]

Crachy et al.

[11] 3,735,460
[45] May 29, 1973

[54] BEARING, CENTERING AND INDEXING MEANS FOR THE SPINDLE CARRIERS OF MULTIPLE SPINDLE MACHINES

[75] Inventors: Rudolf Crachy, Babenhausen; Hans Jacoby, Gottwolshausen, both of Germany

[73] Assignee: Werkzeugmaschinenfabrik Gildemeister & Comp. Aktiengesellschaft, Bielefeld, Germany

[22] Filed: Feb. 16, 1972

[21] Appl. No.: 226,915

[30] Foreign Application Priority Data

Feb. 18, 1971 Germany..................P 21 07 735.0

[52] U.S. Cl.......................29/48.5, 29/35.5, 90/56 R, 74/813 L, 74/824, 308/174
[51] Int. Cl.......................................B23b 3/18
[58] Field of Search..............29/38 A, 38 B, 38 C, 29/37, 35.5, 39, 48.5, 49; 308/174, 234; 74/813 R, 813 L, 823, 824; 90/56 R; 408/35, 71

[56] References Cited

UNITED STATES PATENTS

| 3,661,403 | 5/1972 | Path...................74/813 L X |
| 1,774,655 | 9/1930 | Messinger..............308/174 X |
| 1,125,779 | 1/1915 | Waite....................29/48.5 |

FOREIGN PATENTS OR APPLICATIONS

1,194,166  6/1970  Great Britain

*Primary Examiner*—Gil Weidenfeld
*Attorney*—Michael S. Striker

[57] ABSTRACT

A multiple spindle machine wherein the front portion of the spindle carrier is rotatable in two axial antifriction bearings and a radial antifriction bearing. The front axial bearing is adjacent to an abutment of the machine frame and the rear axial bearing is separated from the front axial bearing by a flange of the spindle carrier. The radial bearing surrounds the spindle carrier behind the rear axial bearing and is surrounded by an axially compressible clamping ring which can be biased by one or more cylinder and piston assemblies to bear against the rear axial bearing and to thereby undergo radial expansion. The rear axial bearing causes the flange to press the front axial bearing against the abutment to thus maintain the front portion of the spindle carrier in a predetermined axial position. The radially expanding clamping ring bears against a cylindrical internal surfae of the frame and at least indirectly against the front portion of the spindle carrier so that the latter is accurately centered in the frame. A ring gear on the spindle carrier is engaged by a second gear which serves to rotate the spindle carrier between successive working positions. The ring gear can also be engaged by a gear segment which is movable radially of the spindle carrier by a cylinder and piston assembly and serves to lock the spindle carrier in an accurately determined position while the workpieces which are rotated by the work spindles in the carrier undergo treatment by one or more tools.

22 Claims, 4 Drawing Figures

BEARING, CENTERING AND INDEXING MEANS FOR THE SPINDLE CARRIERS OF MULTIPLE SPINDLE MACHINES

BACKGROUND OF THE INVENTION

The present invention relates to multiple spindle bar or chucking machines, and more particularly to improvements in centering, indexing and bearing means for the spindle carriers of multiple spindle machines.

In many presently known multiple spindle machines, the spindle carrier is rotatable in radial and axial friction bearings. The play of such bearings must be relatively large in order to allow for expansion of parts at elevated temperatures, i.e., to prevent jamming when the temperature of the spindle carrier and/or the adjoining portion of the machine frame rises. Due to such play of radial and axial friction bearings, the axial and/or radial position of the spindle carrier cannot be determined and maintained with a high degree of accuracy while the workpieces which are rotated by the work spindles in the carrier undergo treatment by one or more tools. As a rule, the spindle carrier will invariably have some freedom of radial and/or axial movement when it is maintained in one of its working positions. Such radial and/or axial movability of the spindle carrier is due to the aforementioned changes in temperature which influence the position of the spindle carrier with reference to the frame and/or the positions of work spindles with reference to the spindle carrier, as well as to many other factors such as the forces which develop when the tools penetrate into the rotating workpieces, the shocks which arise when a tool slide reaches the end of its stroke and strikes against a suitable stop, and particularly the eccentric forces which are applied to the spindle carrier by the conventional indexing and arresting means.

As a result of the just outlined undesirable influences upon the position of the spindle carrier and its work spindles with reference to the frame, the accuracy of finish of workpieces which are treated in heretofore known multiple spindle machines is inferior to that of workpieces which are treated in other types of machine tools, e.g., in single-spindle turning machines. Furthermore, a spindle carrier which is rotatable in axial and radial friction bearings often exhibits a relatively large resistance to rotation between various working positions so that the energy requirements of the mechanism which rotates the spindle carrier are quite high. Therefore, the mechanism for rotating the spindle carrier must be rather bulky and its inertia is sufficiently high to prevent rapid changes in angular position of the spindle carrier to thus prolong the periods of idleness of the multiple spindle machine.

It was already proposed to mount the spindle carrier of a multiple spindle machine in antifriction bearings which employ conical rolling elements and wherein the rolling elements are installed with minimal play. It was also proposed to clamp the spindle carrier upon completion of its movement to a selected angular position. Even though the antifriction bearings with conical rolling elements reduce friction between the spindle carrier and the frame, and even though the clamping of the spindle carrier reduces the likelihood of excessive axial movement during treatment of workpieces, such features fail to eliminate all of the aforementioned influences which develop when a multiple spindle machine is in actual use.

SUMMARY OF THE INVENTION

An object of the invention is to provide a multiple spindle machine with novel and improved axial and radial antifriction bearings which render it possible to rotate the spindle carrier with the exertion of minimal forces, and to assemble and construct the machine in such a way that, once the spindle carrier is moved to a selected angular position, it can be rapidly arrested and held in accurately determined radial and axial positions which remain unchanged during treatment of workpieces which are held and rotated by the work spindles.

Another object of the invention is to provide the multiple spindle machine with novel means for eliminating play in axial and/or radial antifriction bearings for the spindle carrier.

A further object of the invention is to provide a multiple spindle machine wherein the spindle carrier can be rapidly rotated between several working positions and can be automatically locked, centered and axially positioned upon completion of its angular movement to a selected working position.

An additional object of the invention is to provide a multiple spindle machine with novel means for rapidly and reliably locking the spindle carrier in a selected angular position.

A further object of the invention is to provide a multiple spindle machine wherein the tools are capable of treating workpieces with a degree of accuracy and reproducibility which cannot be matched by the presently known multiple spindle machines.

The invention resides in the provision of a multiple spindle machine which comprises a frame having an abutment preferably located close to the working stations where the workpieces are engaged by tools, a rotary spindle carrier mounted in the frame and having front and rear portions one of which (preferably in the front portion) is provided with a circumferential projection (e.g., a flange) inwardly adjacent to the abutment, first and second axial antifriction bearings which are respectively installed between the abutment and one side of the projection and at the other side of the projection and each of which preferably comprises a cage for an annulus of cylindrical rolling elements, axially compressible annular clamping means which is mounted in the frame adjacent to the second axial bearing and at least a portion of which is expansible in response to axial stressing of the clamping means, and stressing means which is operable to axially stress the clamping means in a direction toward the second axial bearing with attendant at least partial elimination of play in both axial bearings and radial expansion of the expansible portion of the clamping means into engagement with the frame and into at least indirect engagement with the one portion of the spindle carrier. The clamping means bears against the second axial bearing whose rolling elements are caused to bear against the projection of the spindle carrier which in turn biases the rolling elements of the first axial bearing against the abutment so that the axial position of the one portion of the spindle carrier with reference to such abutment remains unchanged as long as the clamping means is subjected to axial stresses. The radial expansion of a portion of or the entire clamping means insures accurate centering of the one portion of the spindle carrier in the frame because such expansible portion preferably bears directly against an internal cylindrical surface of the frame and may bear directly against an external cylindrical surface of the one portion of the spindle carrier. A radial antifriction bearing may be interposed between the clamping means and the one portion of the spindle carrier to further reduce friction when the spindle carrier is rotated to a different angular position prior to being locked in such different position by a gear segment which is reciprocable radially of the spindle carrier by a drive preferably including a fluid-operated cylinder and piston assembly. The gear segment may be moved into and out of mesh with a ring gear which is provided on the spindle carrier and which can also serve to rotate the spindle carrier between selected angular positions in response to reception of torque from a gear train. The radial bearing may be installed between a radially expansible portion of the clamping means and the one portion of the spindle carrier or between the spindle carrier and a deformation resistant portion of the clamping means; in the first instance, the expansible portion eliminates play in the radial bearing when the clamping means is subjected to axial stresses. In the second instance, the radially expansible portion of the clamping means can be expanded into direct engagement with the one portion of the spindle carrier while the deformation resistant portion of the clamping means protects the radial bearing against stresses when the clamping means undergoes axial compression.

The novel features which are considered as characteristic of the invention are set forth in particular in the appended claims. The improved multiple spindle machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
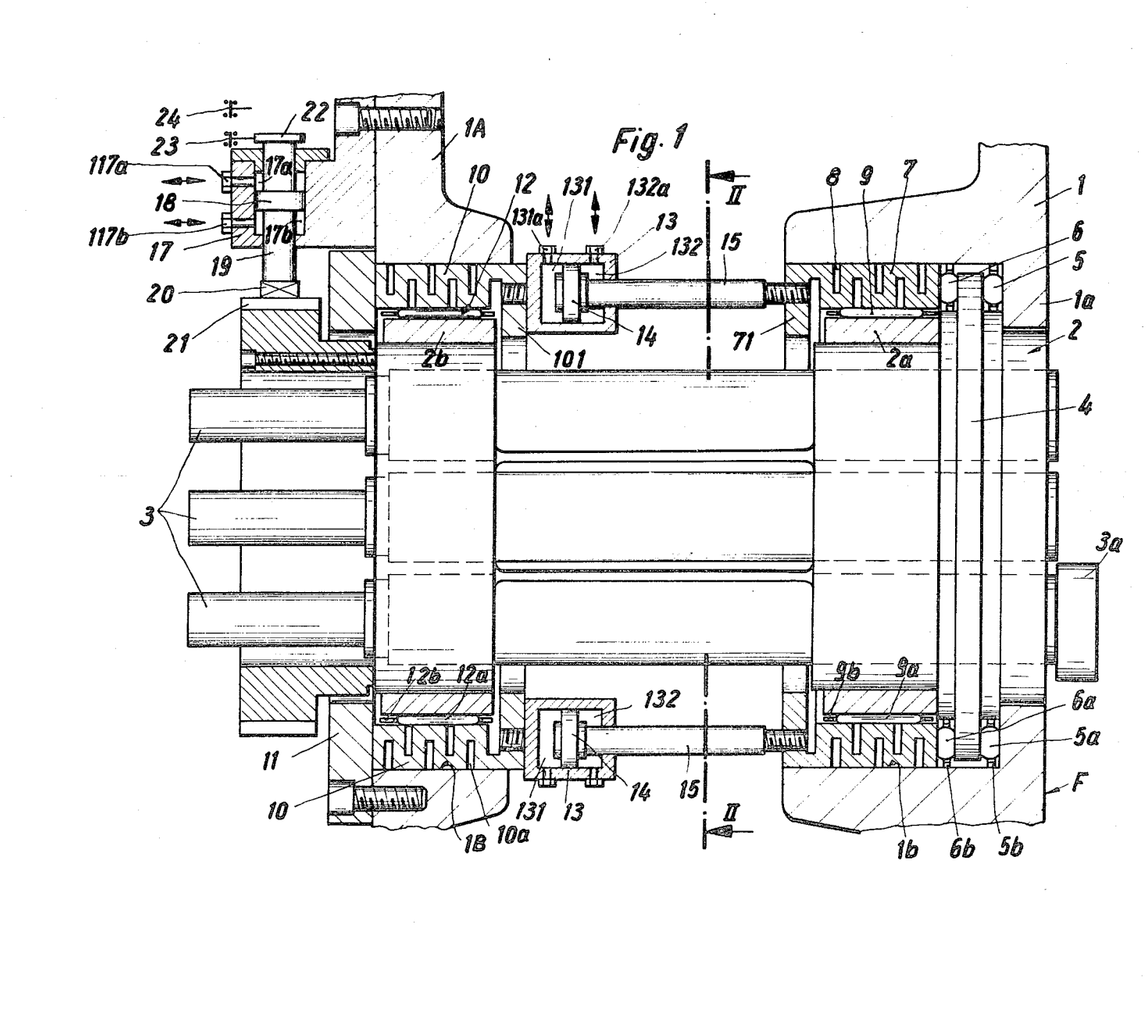
FIG. 1 is a fragmentary longitudinal vertical sectional view of a multiple spindle machine wherein the spindle carrier is constructed and journalled and can be centered and axially positioned in accordance with a first embodiment of the invention.
Figure 2:
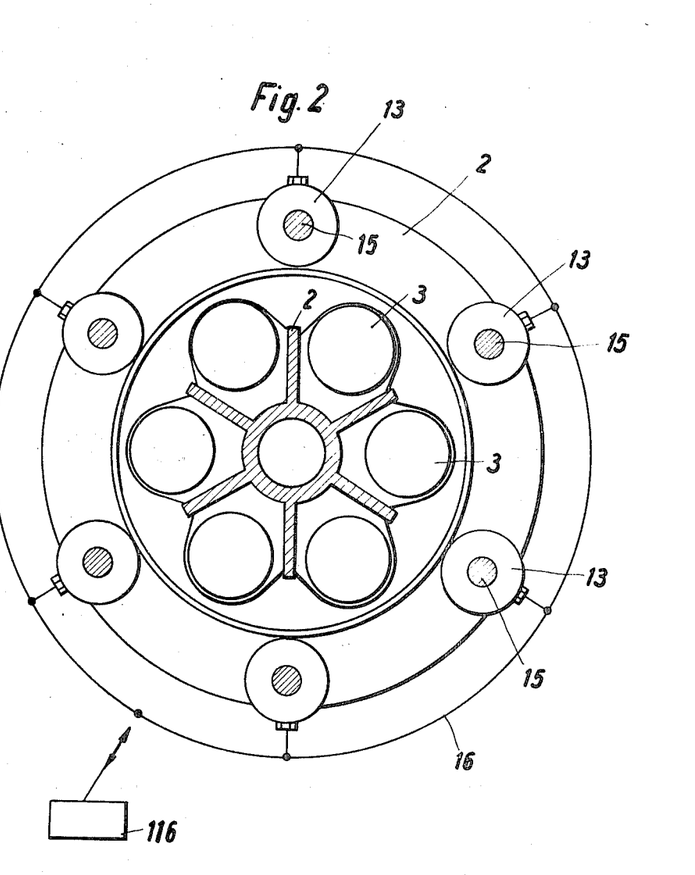
FIG. 2 is a transverse vertical sectional view as seen in the direction of arrows from the line II—II of FIG. 1.

Referring first to FIGS. 1 and 2, there is shown a portion of a multiple spindle machine tool which comprises a frame or housing F having two spaced upstanding frame members 1, 1A. These frame members support a rotary indexible spindle carrier 2 which, in the illustrated embodiment, supports six equidistant work spindles 3. Each spindle 3 is rotatable about an axis which is parallel to the horizontal axis of the carrier 2.

The front end portions or noses of the spindles 3 are provided with chucks or analogous workengaging elements one of which is shown in FIG. 1, as at 3a. The rear end portions of the spindles 3 extend beyond the rear end portion of the carrier 2 and are connected with drive means, not shown, which can cause each spindle to rotate during treatment of a workpiece being held by the respective chuck 3a.

In accordance with a feature of the invention, the front portion of the carrier 2 (i.e., that portion which is nearer to the chucks 3a) is provided with a circumferentially extending projection or flange 4 which is received with some clearance in a cylindrical bore of the front frame member 1. The latter comprises an inwardly extending ring-shaped portion or abutment 1a which is spaced apart from and located forwardly of the flange 4. The annular space between the portion 1a and the flange 4 receives a first or front axial antifriction bearing or thrust bearing 5 which comprises an annulus of cylindrical rolling elements 5a confined in a suitable cage 5b. The rolling elements 5a are prefereably rollers or needles. A preferably (but not necessarily) identical second axial antifriction bearing 6 is mounted in the bore of the front frame member 1 behind the flange 4; this axial bearing comprises an annulus of cylindrical rolling elements 6a and a cage 6b.

The rear axial bearing 6 is installed in the frame member 1 in front of an axially yieldable and radially expansible clamping ring 7. The latter is provided with alternating internal and external annular grooves 8 each having a depth exceeding half the thickness of the clamping ring 7. This ring constitutes the outer race of a radial antifriction bearing 9 whose inner race is a ring 2a rigidly secured to or forming part of the carrier 2 behind the axial bearing 6. The radial bearing 9 comprises an annulus of cylindrical rolling elements 9a (rollers or needles) and a cage 9b. Due to the provision of grooves 8, the clamping ring 7 can be subjected to a certain axial compression to thereby expand radially inwardly and outwardly and to thus bear against the cylindrical internal surface 1b of the frame member 1 as well as against the rolling elements 9a of the radial bearing 9. Furthermore, the axially stressed clamping ring 7 bears against the rolling elements 6a of the rear axial bearing 6 and urges this bearing against the rear surface of the flange 4. This, in turn, causes the front surface of the flange 4 to press the rolling elements 5a of the front axial bearing 5 against the portion or abutment 1a of the frame member 1. Thus, axial compression of the clamping ring 7 in a direction toward the flange 4 results in automatic elimination of play in the axial bearings 5, 6 and radial bearing 9 as well as in accurate centering of the front portion of the spindle carrier 2 in the bore surrounded by the surface 1b of the front frame member 1. The rearmost portion 71 of the clamping ring 7 is preferably rigid and forms an annulus which spacedly surrounds the spindle carrier 2 behind the radial bearing 9.

The rear frame member 1A has an axial bore, bounded by a cylindrical internal surface 1B, which is in exact axial alignment with the bore in the front frame member 1. The bore of the frame member 1A receives with clearance the rear portion of the spindle carrier 2 which is surrounded by a second or rear clamping ring 10 having alternating internal and external annular grooves 10a. The depth of each groove 10a preferably exceeds half the thickness of the clamping ring 10. The latter constitutes the outer race of a second or rear radial antifriction bearing 12 having an annulus of cylindrical rolling elements 12a and a cage 12b. The rolling elements 12a may be identical with the rolling elements 9a. The inner race of the radial bearing 12 is formed by a ring 2b which is rigid or integral with the rear portion of the spindle carrier 2. The main portion of the clamping ring 10 is surrounded by the internal surface 1B and the rear end face of this clamping ring abuts against an annular stop 11 which is bolted, screwed or otherwise fixedly secured to the rear frame member 1A. The front end portion 101 of the clamping ring 10 is a rigid annulus and spacedly surrounds the spindle carrier 2 in front of the radial bearing 12.

This means for axially stressing the clamping rings 7 and 10 comprises six equidistant fluid-operated stressing devices each of which includes a double-acting hydraulic cylinder 13, a piston 14 which is reciprocable in the respective cylinder, and a piston rod 15 which is fixedly connected with the rigid rearmost portion 71 of the front clamping ring 7. The cylinders 13 are fixedly secured to the rigid front end portion 101 of the rear clamping ring 10. Each cylinder 13 has a front cylinder chamber 132 and a rear cylinder chamber 131, and these chambers respectively communicate with ports 132a, 131a for admission and evacuation of a hydraulic fluid. Such fluid is admitted and evacuated by way of conduits one of which is shown in FIG. 2, as at 16. FIG. 2 further shows that the cylinders 13 alternate with the work spindles 3 when the carrier 2 is locked in any one of its six working positions. This insures that the cylinders 13 and the piston rods 15 cannot interfere with convenient access to median portions of the work spindles 3. As shown in FIG. 1, the sleeves for these spindles are accessible between the front and rear portions of the carrier 2, i.e., between the rigid annuli 71 and 101 of the clamping rings 7 and 10.

When the control system of the multiple spindle machine admits a pressurized hydraulic fluid (e.g., oil) into the rear cylinder chambers 131 (by way of the ports 131a while the ports 132a are connected to the sump), the cylinders 13 are caused to bear against the rigid annulus 101 of the rear clamping ring 10 so that the latter undergoes axial compression and radial expansion with attendant automatic centering of the rear spindle carrier portion in the frame member 1A and automatic elimination of play in the rear radial bearing 12. At the same time, the piston rods 15 effect an axial compression of the front clamping ring 7 which undergoes radial expansion and centers the front portion of the spindle carrier 2 in the bore of the front frame member 1. Also, the clamping ring 7 eliminates play in the radial bearing 9 as well as in the axial bearings 5, 6 because the rolling elements 6a are urged against the flange 4 and the latter urges the rolling elements 5a against the portion or abutment 1a of the front frame member 1. Thus, when the fluid pressure in the rear chambers 131 of the cylinders 13 rises, the spindle carrier 2 is automatically maintained in a predetermined axial position and is automatically centered in the frame members 1 and 1A. Eventual changes in the length of the spindle carrier 2 due to changes in temperature have little or no effect on the positions of the chucks 3a because the spindle carrier 2 can expand rearwardly without appreciably affecting the positions of workpieces which are held by and rotate with the spindles 3 during treatment.

The elimination of play in the radial bearings 9 and 12 is due to the fact that the clamping rings 7, 10 constitute the outer races for these radial bearings and that such clamping rings expand radially in response to axial compression on admission of pressurized fluid into the cylinder chambers 131. Since the axially compressed clamping rings 7, 10 respectively bear against the internal surfaces 1b, 1B, the spindle carrier 2 is automatically centered in the frame F. The centering and axial positioning of the carrier 2 is reproducible with a very high degree of accuracy in spite of the fact that the spindle carrier is mounted in radial and axial antifriction (rather than friction) bearings. This insures that each workpiece which reaches a particular working station located in the region to the right of the spindle carrier 2 (as viewed in FIG. 1) is held in the same position as the preceding workpiece so that the accuracy of finish of the workpieces is much higher than in heretofore known multiple spindle machines.

The means for indexing the spindle carrier 2 in each of its six working positions (and more particularly for accurately locating and arresting the spindle carrier in each of these positions) comprises a fluid-operated cylinder and piston assembly which is mounted on the rear frame member 1A. Such assembly comprises a preferably hydraulic double-acting cylinder 17 which is mounted on the frame member 1A rearwardly of the stop 11 and accommodates a reciprocable piston 18 connected with a piston rod 19. The lower end portion of the piston rod 19 extends beyond the cylinder 17 and carries a gear segment 20 which can be moved into and out of mesh with an annulus of gear teeth forming a ring gear 21 on the rear portion of the spindle carrier 2. The upper and lower chambers 17a, 17b of the cylinder 17 respectively communicate with ports 117a, 117b which are connected with valve means (not shown) for controlled admission and evacuation of a hydraulic fluid. The piston rod 19 extends upwardly beyond the cylinder 17 and carries an actuating element or trip 22 for two electric switches 23, 24. When the lower switch 23 is engaged by the trip 22, it produces a signal for termination of admission of a pressurized fluid into the upper chamber 17a of the cylinder 17 because the gear segment 20 is then in proper mesh with the ring gear 21, i.e., the spindle carrier 3 is properly indexed and locked in one of its six working positions. When the trip 22 engages the switch 24, the latter produces a signal which terminates the admission of a pressurized fluid into the lower chamber 17b of the cylinder 17 because the gear segment 20 is then disengaged from and lifted above the ring gear 21 so that the spindle carrier 2 can be rotated to assume or at least to approach the next working position in which it is arrested in response to renewed admission of a pressurized fluid into the upper chamber 17a of the cylinder 17. The parts 17–19 constitute a drive means for moving the gear segment 20 into and out of mesh with the ring gear 21. The means for rotating the spindle carrier 2 while the gear segment 20 is held in its raised position may comprise a train of gears (not shown) one of which (see the gear 121 of FIG. 4) meshes with the ring gear 21. Such gear train need not rotate the spindle carrier 2 with a very high degree of accuracy because the final indexing of the spindle carrier is effected by the teeth of the gear segment 20 when the piston rod 19 is caused to descend. Of course, the spindle carrier 2 is rotated when the axial pressure upon the clamping rings 7 and 10 is relaxed so that the aforementioned gear train can rotate the ring gear 21 with the exertion of a very small force. The clamping rings 7, 10 are subjected to axial compression to center the spindle carrier 2 and to maintain this spindle carrier in a predetermined axial position prior or subsequent to movement of the gear segment 20 into mesh with the ring gear 21 but always subsequent to angular displacement of the spindle carrier through approximately 60° (or through another angle if the number of spindles 3 in the carrier 2 is less than or exceeds six). As a rule, the gear segment 20 will be moved into mesh with the ring gear 21 subsequent to axial compression of the clamping rings 7, 10 so that it can change the angular position of the spindle carrier 3 if such angular position is changed from a desired position to a different position during axial compression and the resulting radial expansion of clamping rings. The chambers 132 in the cylinders 13 of the stressing devices for the clamping rings 7 and 10 receive pressurized fluid from a common source 116 (see FIG. 2) when the treatment of workpieces at the respective working stations is completed. The piston rod 20 of the indexing means is thereupon upwardly substantially radially of the spindle carrier 2 until the trip 22 actuates the switch 24, and the chambers 132 receive pressurized fluid to effect an axial expansion and a radial contraction of both clamping rings. Thus, the carrier 2 is freely rotatable in the bearings 5, 6, 9 and 12, and such rotation is effected by the aforementioned gear train one element (see the gear 121 of FIG. 4) of which meshes (or can be brought into mesh) with the ring gear 21. When the coarse indexing of the spindle carrier 2 is completed, the cylinder chambers 131 receive a pressurized fluid from the common source 116 to cause an axial compression and radial expansion of the clamping rings 7, 10 with the resulting elimination of play in all bearings for the spindle carrier 2. The piston rod 19 thereupon moves the gear segment 20 into mesh with the ring gear 21 and is arrested when the trip 22 actuates the switch 23. This completes the axial positioning centering and indexing of the spindle carrier 2 and the workpieces held by the chucks 3a of the respective spindles 3 are accurately positioned at the new working stations, i.e., the position of each workpiece at the new working station is identical with the position of the preceding workpiece at the same station. The clearance or play in the bearings 5, 6, 9 and 12 is preferably selected in such a way that, when the application of axial stresses to the clamping rings 7 and 10 is terminated, the spindle carrier 2 can be readily rotated through 60° with the exertion of a very small force even if the surrounding temperature varies within a wide range.

The switches 23 and 24 can also perform additional functions. For example, if the movement of the gear segment 20 into mesh with the ring gear 21 of the spindle carrier 2 precedes the axial compression of clamping rings 7 and 10, the signal which is produced by the switch in response to actuation by the trip 22 on the piston rod 19 of the indexing means may be utilized to initiate the admission of a pressurized fluid from the common source 116 into the chambers 131 of the cylinders 13 to thereby start the axial compression of clamping rings 7, 10 with attendant centering and axial positioning of the spindle carrier 2 in an accurately determined angular position. Also, when the treatment of workpieces at the respective working stations is completed and the gear segment 20 is disengaged from the ring gear 21 so that the trip 22 actuates the switch 24, the signal from this switch can terminate the admission of a pressurized fluid into the lower chamber of the cylinder 17 and such signal can simultaneously initiate the admission of a pressurized fluid from the source 116 into the chambers 132 of the cylinder 13 with attendant radial contraction and axial expansion of the clamping rings 7 and 10. The spindle carrier 2 is then ready to be rotated through about 60° prior to renewed movement of the gear segment 20 into mesh with the ring gear 21. The centering and axial positioning of the spindle carrier 2 may take place in several stages. Thus, in response to initial admission of a pressurized fluid into the chambers 131 of the cylinders 13, the clamping ring 10 can move into abutment with the stop 11 and the clamping ring 7 can move into abutment with the rolling elements 6a of the rear axial bearing 6 to eliminate play in the two axial bearings. As the fluid pressure in the chambers 132 rises, the clamping ring 7 respectively biases the rolling elements 6a, 5a against the flange 4 and against the portion 1a of the frame member 1 so that the spindle carrier 2 is moved to the desired axial position. As the fluid pressure in the chambers 132 continues to rise, the clamping rings 7, 10 expand radially and eliminate play in the radial bearings 9 and 12 to insure accurate centering of the spindle carrier 2 in the frame members 1 and 1A. It was found that the clamping rings 7 and 10 insure accurate centering of the spindle carrier 2 even if the temperature at the rear portion of the spindle carrier differs substantially from the temperature in the region of the front frame member 1, i.e., if the temperature of the front radial bearing 9 deviates considerably from the temperature of the rear radial bearing 12.

Figure 3:
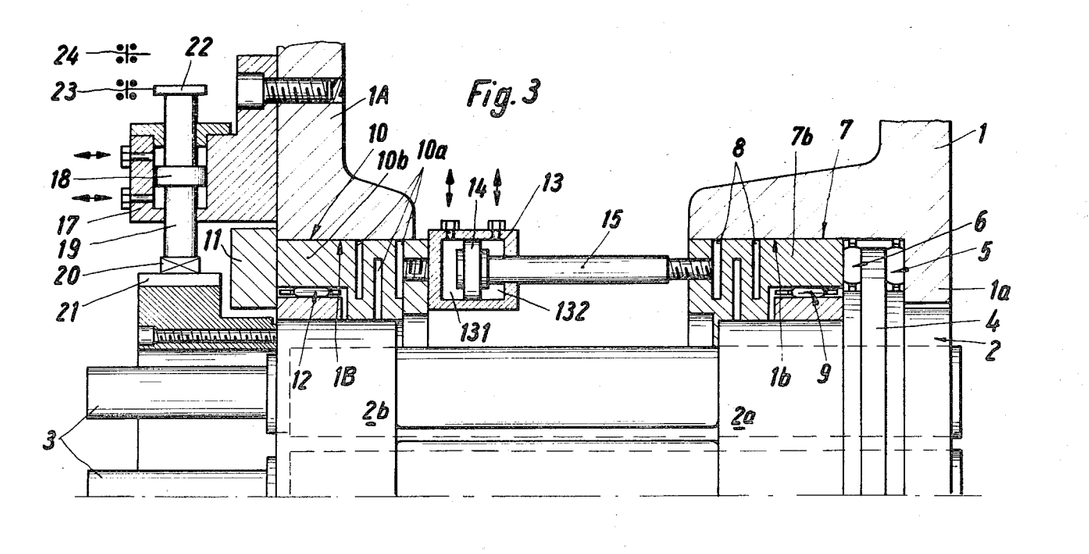
FIG. 3 is a fragmentary longitudinal vertical sectional view of a multiple spindle machine wherein the means for centering the spindle carrier employs modified clamping means.

FIG. 3 illustrates a portion of a second multiple spindle machine wherein all such component parts which are identical with or clearly analogous to the corresponding parts of the machine shown in FIGS. 1–2 are denoted by similar reference characters. The main difference between the two machines is that the radial bearings 9 and 12 shown in FIG. 3 are shorter than the similarly numbered bearings of FIG. 1 and that the clamping rings 7, 10 respectively comprise rigid or deformation-resistant portions 7b, 10b which are free of grooves 8, 10a and respectively surround the radial bearings 9 and 12. The grooved portions of the clamping rings 7 and 10 respectively extend radially inwardly and all the way into immediate proximity of the rings 2a, 2b at the front and rear ends of the spindle carrier 2. Thus, when the chambers 131 of the cylinders 13 (only one shown in FIG. 3) receive a pressurized fluid, the axial stressing of clamping rings 7 and 10 again results in elimination of play in the axial bearings 5, 6 but the radial bearings 9 and 12 are not subjected to any appreciable stresses because they are respectively surrounded by the rigid portions 7b, 10b of the clamping rings 7 and 10. Nevertheless, the spindle carrier 2 is properly centered in the frame members 1 and 1A because the grooved (radially expansible) portions of the clamping rings 7 and 10 then respectively bear against the cylindrical internal surfaces 1b, 1B of the frame members 1, 1A as well as against the rings 2a, 2b of the spindle carrier 2. When the fluid pressure in the chambers 131 is relaxed and the pressurized fluid is admitted into the chambers 132 of the cylinders 13, the grooved portions of the clamping rings 7, 10 preferably surround the rings 2a, 2b with at least some clearance so that the spindle carrier 2 can be readily rotated through a desired angle with the exertion of a minimal effort. An advantage of the multiple spindle machine of FIG. 3 is that the radial bearings 9 and 12 need not be subjected to any (or are subjected to minimal) stresses when the clamping rings 7 and 10 undergo axial compression.

Figure 4:
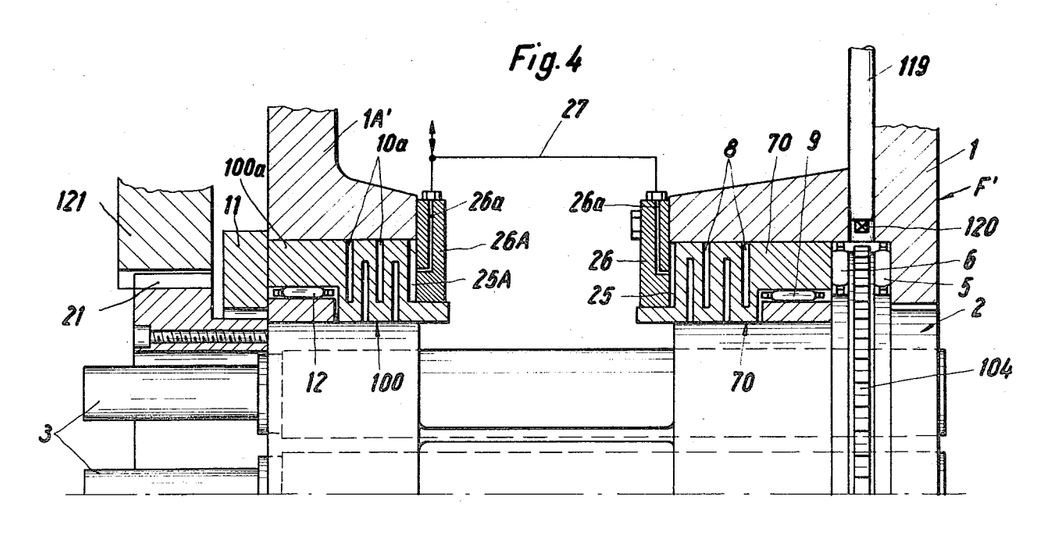
FIG. 4 is a similar fragmentary longitudinal vertical sectional view of a multiple spindle machine wherein the spindle carrier can be held against movement from the selected angular position in the region of its front end.

Referring to FIG. 4 there is shown a portion of a third multiple spindle machine which, in some respects, is similar to the machine of FIG. 3 (because the radial bearings 9, 12 are respectively surrounded by rigid, i.e., ungrooved and hence deformation-resistant ring-shaped portions 70a, 100a of modified clamping rings 70 and 100). In addition, the machine of FIG. 4 comprises modified stressing means for effecting axial compression of the clamping rings 70 and 100. As shown, these clamping rings 70, 100 constitute annular pistons which are mounted in single-acting cylinders formed in part by or provided on the frame members 1' and 1A' of a modified frame F'. In the embodiment of FIG. 4, each of the frame members 1', 1A' constitutes the main portion of the respective single-acting cylinder and these frame members are respectively provided with covers 26, 26A adjacent to the inner axial ends of the corresponding clamping rings 70 and 100. The admission and evacuation of fluid into and from the cylinder chambers 70a, 100a takes place by way of channels 26a machined into the covers 26, 26A.

When the cylinder chambers 25, 25A receive a presurized fluid from a conduit 27, the clamping rings 70, 100 undergo axial compression to eliminate play in the axial bearings 5, 6 and to insure that the spindle carrier 2 assumes a predetermined axial position. Also, the grooved portions of the clamping rings 70, 100 expand to thereby center the spindle carrier 2 in the frame members 1', 1A' without any appreciable stressing of the radial bearings 9 and 12.

The reference character 121 denotes one gear of the aforementioned means for rotating the spindle carrier 2 by way of the ring gear 21 between successive working positions. The indexing mechanism is mounted on the front frame member 1' and its gear segment 120 can be moved into and out of mesh with a gear 104 which also performs the function of the projection or flange 4 shown in FIGS. 1 and 3. The drive means for moving the gear segment 120 into and out of mesh with the gear or flange 104 includes a cylinder and piston assembly whose piston rod is shown at 119. It is clear that the gear 121 can also mesh with the flange or gear 104, that the indexing mechanism can be mounted on the rear frame member 1A' while the gear 121 meshes with the flange or gear 104, or that the rear portion of the spindle carrier 2 can be provided with two ring gears one of which meshes with the gear 121 and the other of which can be engaged by the gear segment of the indexing means. In the embodiment of FIG. 4, the gear 104 can comprise a flange corresponding to the flange 4 of FIG. 1 or 3 and with several gear segments which are mounted on the flange in such positions that one thereof can mesh with the gear segment 120 of the indexing mechanism in each working position of the spindle carrier 2. An advantage of an indexing mechanism which is mounted on the front frame member (1' of FIG. 4) is that the gear segment engages the spindle carrier in the region of the axial bearings 5 and 6, i.e., in the region where the spindle carrier is positively held against lengthwise movement while each of the rotating workpieces undergoes treatment by one or more tools.

The improved multiple spindle machine exhibits the following important advantages:

Since the spindle carrier 2 is rotatable in radial and axial antifriction bearings, the friction which develops when the spindle carrier is rotated by the means including the gear 121 is very negligible so that the means for rotating the spindle carrier consumes little energy and can be rapidly accelerated or decelerated to thus reduce the length of intervals which elapse between consecutive treatments of workpieces at successive working stations.

The abutment 1a or 1a' insures that the spindle carrier can be arrested and held in an accurately determined axial position in which the spindle carrier remains during treatment of workpieces. Since the abutment 1a or 1a' is preferably close to the chucks 3a, i.e., close to the workpieces, eventual thermally induced expansion or contraction of the spindle carrier contributes very little to changes in axial positions of the workpieces when the front axial bearing 5 is clamped between the abutment 1a or 1a' and the member 4 or 104.

The axially stressed front clamping ring 7 or 70 insures that the front portion of the spindle carrier 2 is accurately centered in the front frame member 1 or 1', i.e., close to the chucks 3a, to thus prevent any radial movements of spindles 3 while the tools engage with and remove material from the workpieces.

The centering and positioning action of stressed clamping members 7, 10 or 70, 100 is sufficiently strong to prevent any undesirable radial and/or axial movements of the spindle carrier 2 when a tool slide strikes against a stop, when a tool begins to penetrate into a workpiece, when a tool penetrates through a workpiece, and/or when a tool is disengaged from the adjoining workpiece.

The means for rotating the spindle carrier 2 cannot influence the arresting and locking action of the gear segment 20 or 120.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the means and range of equivalence of the claims.

What is claimed as new and desired to be protected by Letters Patent is set forth in the appended

1. In a multiple spindle machine, the combination of a frame having an abutment; a rotary spindle carrier mounted in said frame and having front and rear portions one of which is provided with a circumferential projection inwardly adjacent to said abutment; first and second axial antifriction bearings respectively installed between said abutment and one side of said projection and at the other side of said projection; axially compressible annular clamping means mounted in said frame adjacent to said second bearing, at least a portion of said clamping means being expansible radially in response to axial stressing thereof; and stressing means operable to axially stress said clamping means in a direction toward said second bearing to provide at least partial elimination of play in both said bearings and radial expansion of said portion of said clamping means into engagement with said frame and into at least indirect engagement with said one portion of said carrier whereby the carier is centered in said frame and is maintained in a predetermined axial position as a result of elimination of play in said first bearing which is biased by said projection against said abutment.

2. The combination of claim 1, further comprising indexing means for releasably maintaining said carrier in a selected one of a plurality of working positions, comprising an annulus of gear teeth provided on said carrier and a gear segment mounted on said frame and movable into and out of mesh with the teeth of said carrier.

3. The combination of claim 2, wherein said indexing means further comprises drive means for moving said gear segment substantially radially of said carrier.

4. The combination of claim 3, wherein said drive means comprises a fluid-operated cylinder mounted on said frame and a piston reciprocable in said cylinder, said piston having a piston rod and said gear segment being affixed to said piston rod.

5. The combination of claim 1, further comprising means for rotating means for rotating said carrier with reference to said frame including a ring gear provided on said carrier and second gear means meshing with said ring gear and being rotatable to thereby rotate said carrier, and indexing means for arresting said carrier in a selected one of a plurality of predetermined working positions, said indexing means comprising a gear segment movable with reference to said carrier into and out of mesh with said ring gear.

6. The combination of claim 1, further comprising means for rotating said carrier with reference to said frame, including an annulus of gear teeth provided on said carrier in the region of said projection and second gear means meshing with said gear teeth and being rotatable to thereby rotate said carrier, and indexing means for arresting said carrier in a selected one of a plurality of predetermined angular working positions, said indexing means comprising a gear segment mounted in said frame and being movable with reference to said carrier into an out of mesh with said gear teeth.

7. The combination of claim 6, wherein said gear teeth are provided on said projection and said gear segment is movable in said frame substantially radially of said carrier.

8. The combination of claim 1, further comprising a radial antifriction bearing interposed between said one portion of said carrier and said clamping means.

9. The combination of claim 8, wherein said radial bearing is interposed between said radially expansible portion of said clamping means and said one portion of said carrier so that said radially expansible portion eliminates play in said radial bearing in response to axial stressing of said clamping means.

10. The combination of claim 8, wherein said clamping means comprises a second portion which is resistant to radial deformation in response to axial stressing of said clamping means, said radial bearing being interposed between said second portion of said clamping means and said one portion of said carrier and said radially expansible portion being positioned to contact said one portion of said carrier at least when said clamping means is subjected to axial stresses.

11. The combination of claim 8, wherein said frame further comprises stop means adjacent to the other portion of said spindle carrier and further comprising second axially compressible annular clamping means mounted in said frame inwardly adjacent to said stop means, at least a portion of said second clamping means being expansible radially in response to axial stressing thereof and said stressing means being operable to axially stress said second clamping means in a direction toward and against said stop means simultaneously with axial stressing of said first mentioned clamping means to provide expansion of said portion of said second clamping means into engagement with said frame and into at least indirect engagement with said other portion of said carrier whereby said other portion of said carrier is also centered in said frame.

12. The combination of claim 11, further comprising a second radial antifriction bearing interposed between said second clamping means and said other portion of said carrier.

13. The combination of claim 12, wherein said second radial bearing is interposed between said radially expansible portion of said second clamping means and said other portion of said carrier so that said radially expansible portion of said second clamping means eliminates play in said second radial bearing in response to axial stressing of said second clamping means.

14. The combination of claim 12, wherein said second clamping means comprises a second portion which is resistant to radial deformation in response to axial stressing thereof, said second radial bearing being interposed between said second portion of said second clamping means and said other portion of said carrier and said radially expansible portion of said second clamping means being positioned to contact said other portion of said carrier at least when said second clamping means is subjected to axial stresses.

15. The combination of claim 12, wherein each of said bearings comprises an annulus of at least substantially cylindrical rolling elements.

16. The combination of claim 11, wherein said stressing means comprises at least one cylinder and piston assembly including a cylinder secured to one of said clamping means, a piston reciprocable in said cylinder, and a piston rod rigid with said piston and secured to the other clamping means so that, when said cylinder receives a pressurized fluid to expel said piston rod, said first and second clamping means are simultaneously subjected to axial stresses.

17. The combination of claim 16, wherein said stressing means comprises a plurality of equidistant cylinder and piston assemblies extending in parallelism with the axis of and surrounding said carrier between said first and second clamping means.

18. The combination of claim 17, further comprising a common source of pressurized fluid for the cylinders of said assemblies.

19. The combination of claim 16, wherein said cylinder and said piston rod are threadedly connected with the respective clamping means.

20. The combination of claim 16, wherein said one and said other clamping means respectively comprise first and second rigid annular portions which are respectively secured to said cylinder and said piston rod.

21. The combination of claim 11, wherein said stressing means comprises first and second fluid-operated cylinders provided on said frame, said first and second clamping means respectively constituting the pistons of said first and second cylinders and said stressing means further comprising means for admitting into said cylinders a pressurized fluid to effect simultaneous axial stressing of said first and second clamping means in directions toward said second axial bearing and said stop means respectively.

22. The combination of claim 21, wherein at least a portion of each of said cylinders forms an integral part of said frame and each of said cylinders further comprises a cover inwardly adjacent to the respective clamping means.

* * * * *